United States Patent [19]

Santambrogio et al.

[11] Patent Number: 5,425,888
[45] Date of Patent: Jun. 20, 1995

[54] POLYMERIC ADDITIVE FOR LUBRICATING OILS

[75] Inventors: Alberto Santambrogio; Giulio Polimeni, both of Milan, Italy

[73] Assignee: Agip Petroli S.p.A., Rome, Italy

[21] Appl. No.: 142,929

[22] Filed: Oct. 29, 1993

[30] Foreign Application Priority Data

Nov. 6, 1992 [IT] Italy ............................... MI92A2552

[51] Int. Cl.6 ................. C10M 129/38; C10M 143/02
[52] U.S. Cl. ........................ 252/51.005 A; 525/379; 525/386; 525/285; 525/301
[58] Field of Search .................. 252/51.5 A; 525/301, 525/285, 379, 386

[56] References Cited

U.S. PATENT DOCUMENTS

| | | | |
|---|---|---|---|
| 3,316,177 | 4/1967 | Dorer, Jr. ...................... | 252/51.5 A |
| 3,326,804 | 6/1967 | Hu .......................... | 252/34 |
| 3,923,930 | 12/1975 | Waldbillig . | |
| 4,144,181 | 3/1979 | Elliott et al. . | |
| 4,160,739 | 7/1979 | Stambaugh et al. ................... | 252/34 |
| 4,169,063 | 9/1979 | Kiovsky ......................... | 252/51.5 A |
| 4,219,432 | 8/1980 | Girgenti et al. ................ | 252/51.5 A |
| 4,517,104 | 5/1985 | Block et al. ................... | 252/51.5 A |
| 5,273,671 | 12/1993 | Patil et al. ...................... | 252/51.5 A |
| 5,275,747 | 1/1994 | Gutierrez et al. ............. | 252/51.5 A |

FOREIGN PATENT DOCUMENTS 0002286 6/1979 European Pat. Off. .
0400874 12/1990 European Pat. Off. .

*Primary Examiner*—Jacqueline V. Howard
*Attorney, Agent, or Firm*—Oblon, Spivak, McClelland, Maier & Neustadt

[57] ABSTRACT

Oil-soluble polymer improving the viscosity index of lubricating oils, endowed with dispersant properties and capable of lowering the pour point ("pour point depressant"), obtained by means of a first step of reaction between a polyolefinic copolymer and a mixture of $C_8$–$C_{25}$ alcohol (meth)acrylates and (meth)acrylic acid and a second step of condensation of the so modified copolymer with a polyamine.

17 Claims, No Drawings

POLYMERIC ADDITIVE FOR LUBRICATING OILS

The present invention relates to an oil-soluble grafted polymer, which improves the viscosity index of lubricating oils (Viscosity Index Improver—V.I.I.), endowed with dispersant properties and capable of depressing the pour point.

In the technical sector dealing with lubricating oils, adding an oil-soluble polymer capable of improving the rheological behaviour of lubricating oils with varying temperature (Viscosity Index Improver—V.I.I.), for example, a polymer or copolymer of an alkyl ester of acrylic or methacrylic acid, containing in its alkyl radical such a number of carbon atoms as to make it oil-soluble, is known.

Also known in the art are the benefits which can be obtained by means of the addition, to said oil-soluble polymer, of a copolymerizable or graftable, nitrogen-containing monomer, in order to supply the resulting product with characteristics as dispersant, besides those characteristics which make it a viscosity index improver agent. Such a copolymerizable, nitrogen-containing monomer is generally selected from vinylimidazoles, vinylpyrrolidones, vinylpyridines and N,N-dialkyl-aminoethyl methacrylates.

An alternative to copolymerization consists in grafting ethylene-propylene copolymers (EPM) or ethylene-propylene-diene terpolymers (EPDM) with one or more monomer(s) acting as dispersant and pour point depressant agents, in such a way V.I.I. agents being obtained which are also endowed with dispersant and pour point depressant properties.

So, for example, U.S. Pat. No. 3,923,930 discloses a terpolymer grafted with a polymethacrylate constituted by methacrylates of long-chain alcohols and dialkyl amino alkyl methacrylates.

Another technique consists in grafting a copolymer or terpolymer with molecules of either acidic or basic character capable, in their turn, of supplying the substrate with reactive sites.

So, U.S. Pat. No. 4,144,181 discloses EPM or EPDM polymers grafted with maleic anhydride and subsequently caused to react with a polyamine.

U.S. Pat. No. 4,146,489 discloses an EPM or EPDM copolymer grafted with units selected from C-vinylpyridine and N-vinylpyrrolidone.

The need remained still for having available an additive which would be effective at lower concentrations and which would be flexible, in the sense of being easily able to modify the desired activity of pour: point depressant and dispersant thereof, by simply varying the operating conditions.

The present applicant found now a nitrogen-containing grafted copolymer which overcomes or, at least, essentially reduces the drawbacks which affect the prior art.

Furthermore, a simple and advantageous route was found in order to prepare the above said grafted polymer.

In accordance therewith, a first aspect of the present invention relates to a viscosity index improver additive, endowed with dispersant and pour point depressant properties, obtained by means of a two step reaction, (a) in the first step causing a copolymer selected from ethylene-propylene or ethylene-propylene-diene, to react, under free-radical polymerization conditions, with a composition constituted by (meth)acrylic acid and (meth)acrylic esters of general formula (I)

$$CH_2=C(R)-COOR' \quad (I)$$

in which R is selected from hydrogen and methyl, R' is an essentially straight alkyl radical, or a mixture of essentially straight alkyl radicals, with the content of branched isomers being lower than 20% by weight, of from 8 to 25 carbon atoms;

(b) in the second step, causing the product obtained from the (a) step to react with a polyamine of general formula (II):

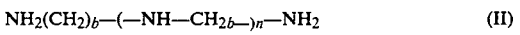

$$NH_2(CH_2)_b-(-NH-CH_{2b}-)_n-NH_2 \quad (II)$$

wherein b may be either 2 or 3, and n is an integer comprised within the range of from 0 to 5, until the carboxy groups are totally, or practically totally, transformed into amidic groups.

The ethylene-propylene copolymer (EPM) used in the present invention is oil-soluble and has a weight average molecular weight ($M_w$) of from 5,000 to 500,000, preferably of from 10,000 to 200,000, and still more preferably of from 20,000 to 100,000.

A rather narrow molecular weight distribution, as determined by the ratio of the weight average molecular weight ($M_w$) to the number average molecular weight ($M_n$), is preferable. In fact, values of the ratio of $M_w/M_n$ lower than 7 are preferable; still more preferable are values, for that ratio, lower than, or equal to, 4. The ethylene content in said copolymer is comprised within the range of from 15 to 90% by weight, preferably of from 30 to 80% by weight.

The ethylene-propylene-diene terpolymers contain low levels (preferably lower than 10% by weight), of a non-conjugated diene, for example, 1,4-hexadiene, dicyclopentadiene, ethylidene-norbornene. The ethylene amount, on the contrary, is comprised within the range of from 45 to 65% by weight. The weight average molecular weight is comprised within the range of from 10,000 to 200,000 with $M_w/M_n$ values lower than 8.

When the present invention is implemented, besides EPM and EPDM, also minor amounts, preferably less than 30% of the polymeric charge, can be used of other polyolefinic material of rubber-like character, such as hydrogenated styrene-butadiene, styrene-isoprene copolymers, atactic polypropylene, low-density polyethylene.

By the expression "(meth)acrylic acid and (meth)acrylic ester", acrylic or methylacrylic acids and esters, or their mixtures, are understood.

In the (meth)acrylate of general formula (I), R' is an essentially straight alkyl radical, or a mixture of essentially straight alkyl radicals, in which the content of branched isomers is lower than 20% by weight, of from 8 to 25, preferably from 10 to 20, carbon atoms.

According to a preferred embodiment of the present invention, a mixture of $C_{10}$–$C_{15}$ (meth)acrylates and $C_{16}$–$C_{20}$ (meth)acrylates, still more preferably $C_{12}$–$C_{14}$ and $C_{16}$–$C_{18}$ (meth) acrylates, is used, with the ratio, by weight, of both components to each other being comprised within the range of from 6:1 to 0.5:1, preferably of from 3:1 to 1:1.

In order to practice the present invention, any polyamines of general formula (II), for example, triethylenetetramine (n=2, b=2), diethylenetriamine (n−1, b=2), tripropylenetetramine (n=2, b=3), pentaethylenehexamine (n=4, b=2), dipropylenetriamine (n−1, b=3) can be used.

According to the preferred embodiment of the present invention, the value "n" of the polyamine of general formula (II) is comprised within the range of from 1 to 4, and s till more preferably, is 2.

The preparation of the polymeric additive according to the present invention can be carried out in an inert solvent, or in the absence of solvents, preferably in an inert solvent, still more preferably in a mineral oil, in which the polymer or terpolymer to be grafted are dissolved in an amount of from 2 to 50% by weight, preferably of from 5 to 20% by weight.

The reaction of grafting and copolymerization with the (meth)acrylic derivatives (first reaction step) require a free-radical initiator. Useful for that purpose are alkyl peroxyesters, alkyl peroxides, alkyl hydroperoxides, diacylperoxides and the like, for example, t-butyl perbenzoate, di-t-butyl peroxide, t-butyl hydroperoxide, cumene hydroperoxide, benzoyl peroxide, t-butyl peroctanoate, preferably t-butyl peroctanoate. Of course, also mixtures of the above said initiators can be used.

The initiator amount is comprised within the range of from 2 to 12% by weight, preferably of from 3 to 9% by weight, relatively to the total weight of the reactants, excluding the polyamine.

The necessary temperature in order to carry out the grafting and copolymerization reaction is comprised within the range of from 70° to 150° C., preferably of from 90° to 130° C. It is well known to those skilled in the art that the desired temperature conditions the selection of the free-radical initiator.

The ratio, by weight, of the polymer to be grafted to the (meth)acrylate of general formula (I) to (meth)acrylic acid may be varied according to the desired characteristics the end product. In other terms, should one wish to obtain a product with prevailing characteristics as a pour point depressant and displaying a lower dispersant power, higher values of the ratio of (meth)acrylic esters to (meth)acrylic acid should be selected. Should a product with a higher dispersant power be desired, higher ratios of (meth)acrylic acid to (meth)acrylic esters should be used, In any case, the ratio, by weight, of the polymer to be grafted:(meth)acrylic esters of formula (I):(meth)acrylic acid is generally comprised within the range of from 40:20:1 to 10:2:1, preferably of from 25:16:1 to 14:3:1.

The grafting and copolymerization reaction is preferably carried out by gradually feeding (meth)acrylic acid to the reaction mixture containing the polymer, the (meth)acrylates of general formula (I) and a first aliquot of the free-radical initiator. The residual portion of the latter will be added as successive aliquots, in order to complete the reaction of (meth)acrylic acid and (meth)acrylates.

The reaction time is a function of the selected temperature and of the rate of addition of (meth)acrylic acid and initiator.

For indicative purposes, the grafting and copolymerization reaction is complete, when operating an approximately 70°–150° C., within a time of from 2 to 4 hours.

When the step of grafting and copolymerization, in which the (meth)acrylic derivatives react with the polymer and with each other, is ended, the second step of reaction between the carboxy groups of (meth)acrylic acid and the polyamine of general formula (II), yielding the corresponding amides, starts.

The polyamine, or the mixtures of polyamines, of general formula (II) is added to the grafted polymer in a molar amount of approximately ½ relatively to the carboxy functions. Also higher ratios could be used, but in that case, any unreacted polyamine should be removed from the end product. Molar ratios of polyamine(s):COOH groups decidedly lower than ½ are unsuitable, because the end product would contain undesired free carboxy groups.

The polyamine of general formula (II) can be added to the grafted polymer at any temperatures, however the polyamine should preferably be added to the reaction mixture soon after the grafting and copolymerization reaction, that is to say, at temperatures comprised within the range of from 70° to 150° C., preferably of from 90° to 130° C.

The above said mixture, constituted by grafted polymer and the polyamine of general formula (II) requires a step of heating at temperatures of from 130° to 190° C. This heating step is necessary in order to transform into amides the interaction products of the carboxy groups and the $-NH_2$ groups of the polyamine. In fact, it could be hypothesized that owing to the interaction between $-COOH$ and $-NH_2$ groups, the corresponding salts are first formed, for example, $-COO-RNH_3^+$, which, subsequently, in particular due to the effect of temperature increase, yield the corresponding $-CONHR$ amide, with water being expelled.

The disappearance of the ammonium salts can be evidenced by means of spectroscopic techniques, in particular by I.R. analysis.

Also this second step lasts for a variable time interval according to various parameters, in particular as a function of temperature. By operating at a temperature comprised within the range of from 170° to 180° C., this second step could be regarded as being complete within a time of from 2 to 4 hours. At the end, the reaction mixture should preferably be submitted to a treatment aiming at removing all formed water, any possible traces of unreacted products and initiator decomposition products. For that purpose, the reaction mixture can be kept some minutes at a high temperature, under reduced pressure or, alternatively, under a flowing inert gas stream.

The grafted polymer obtained at the end of the above disclosed process displays a variable nitrogen content according to the amount of (meth)acrylic acid and to the polyamine type. For indicative purposes, the grafted polymers which are obtained by means of the process according to the present invention contain from 0.3 to 4% by weight, preferably from 0.6 to 2% by weight, of nitrogen. Inasmuch as the dispersant power is a function of nitrogen content, it will be obvious that the process according to the present invention makes it possible products to be obtained with different dispersant power, by simply varying the level of (meth)acrylic acid and the values of "n" and "b".

The pour point depressant property can be varied by acting on the ratio of $C_{10}-C_{15}$ (meth)acrylates to $C_{16}-C_{20}$ (meth)acrylates. In fact, with increasing amounts of $C_{16}-C_{20}$ (meth)acrylates, the pour point depressant performance increase in high-viscosity oils.

At the end of the above process, a solution of a polymeric additive with V.I.I., dispersant and pour point depressant properties in an inert solvent is obtained.

The polymeric additive may optionally be isolated neat, by removing the solvent according to known techniques, for example, when the solvent is volatile enough, under reduced pressure.

The polymeric additive according to the present invention can be used in finished lubricants (for example, for road vehicle engines), in combination with other usual additives, such as dispersants, detergents, anti-wear additives, antioxidants and so forth.

The additive can be added as such to the lubricating oil or, according to a preferred embodiment, such an addition can be made easier by using a solution containing from 5 to 30% by weight, preferably from 10 to 20%, of the additive dissolved in a solvent-extender, According to a preferred aspect of the present invention, the above said solvent-extender is the same mineral oil used as the inert solvent in the preparation of the polymeric additive.

A further aspect of the present invention is a lubricating oil composition containing a major portion of mineral or semisynthetic oil and an effective amount (as V.I.I., dispersant and pour point depressant agent) of the nitrogen-containing polymeric additive disclosed hereinabove. Such an effective amount, as based on neat polymeric additive, is generally comprised within the range of from 0.4 to 6%, preferably of from 0.6 to 4% by weight.

The following examples are reported in order to illustrate the present invention in greater detail.

EXAMPLE 1 ("A" Additive)

300 g of a solution at 10% by weight, in SN 130 mineral oil, of a rubber constituted by an ethylene-propylene copolymer in the ratio of 54–46% weight/weight ($M_w = 200,000$, polydispersity $= 2.3$) is charged to a reactor constituted by a 4-neck flask of 1 liter of capacity. The above said solution has a kinematic viscosity (KV), at 100° C., of approximately 1,200 cSt.

The content of the flask is heated, for one hour, under a nitrogen flow (about 40 liters/hour), up to the temperature of 107° C.

Then, 15 g is added to the reactor of a mixture of higher alcohol methacrylates, with the alcoholic radicals belonging to the $C_{12}$–$C_{18}$ cut, with the following distribution: $C_{12}$–$C_{14}$:$C_{16}$–$C_{18}$ equal to 60:40 (weight/weight).

Together with said methacrylates, a first portion (from a total of four portions) of 0.5 g of t-butyl peroctanoate is added.

Then, the addition to the reaction vessel is started of an amount of 1.6 g of acrylic acid, with the addition being so regulated by means of a metering pump, as to be complete within a time of approximately 60 minutes. During the above said metered addition of the acid, the temperature should be kept approximately equal to 107° C.

30 minutes after the beginning of the metered acid feed, a second addition is carried out of 0.5 g of peroxide, followed, after a further 30 minutes, by the third addition. Half an hour after the acid feed end, the fourth, and last, peroxide portion is added.

The reaction progress is monitored by I.R. analysis carried out on samples collected from the reaction flask approximately every 30 minutes. By examining the I.R. absorption spectra, the disappearance of the absorption peaks attributable to the (meth)acrylic monomers can be monitored.

When the first reaction phase, of methacrylic esters and acrylic acid grafting and copolymerization (which lasts approximately 3 hours) is concluded, the second step begins, of amidation of the acrylic acid by means of the reaction with triethylenetetramine (TETA).

The temperature of the reactor temperature control system is now set at 180° C.; the reaction mixture reaches this temperature value during approximately 60 minutes.

When the system reaches a temperature of about 140° C., the addition of TETA is carried out (1.6 g, corresponding to a ratio of 1:2, based on acrylic acid). From the examination of the I.R. spectra, the formation of a salt adduct between the acrylic acid and the amine can be observed initially; only at a later time, the formation of the amidic bond, which takes place at about 180° C., can be observed.

In order to reach the complete conversion into the amide and subsequently strip off any formed water, about 3 hours of reaction is necessary.

The reaction mixture is finally cooled to about 100° C., is discharged from the reactor, and is checked by means of an I.R. spectrum.

The total reaction time resulted to be of about 9 hours, subdivided as follows:

| | |
|---|---|
| heating and venting: | 1 hour, |
| grafting and copolymerization: | 3 hours, |
| heating from 107 to 180° C.: | 1 hour, |
| amidation and stripping: | 3 hours, |
| cooling and discharging: | 1 hour. |

Product Characterization

The dispersant properties have been evaluated by means of the so-said "asphaltene test". The asphaltenes are produced by oxidizing naphthenic oils in the presence of cupric naphthenate as catalyst. The test modalities are as follows: 100 mg of the substrate the dispersant properties of which are to be determined, are adjusted at a total weight of 20 g with SN150 mineral oil, slightly heating and stirring: separately, a solution of 30 mg of asphaltenes dissolved in 10 mL of methylene chloride is prepared and is subsequently added to the dissolved polymer. The solution is kept in an oven at 150° C. for 60 minutes, in order to remove any volatiles and then is allowed to cool.

The solution is transferred to a turbidimeter cuvette and on the instrument the turbidity value is read, which increases with decreasing polymer dispersant power. After a first reading, the solution is centrifuged at 7,500 rpm (revolutions per minute) for 10 minutes, and a second reading is carried out on the turbidimeter. The dispersivity index is given by the following equation:

$$I.D. = \frac{\text{turbidity after centrifugation}}{\text{turbidity before centrifugation}} \times 100 \qquad 3$$

Also the absolute values of turbidity constitute a merit factor so, with the I.D. value being the same, an additive with a lower absolute value of turbidity is preferable.

The solution of grafted additive in mineral oil, as obtained from the above disclosed reaction, contains 14.6% by weight of grafted polymer (as determined by dialysing the same solution).

The solution displays the following characteristics:

| | |
|---|---|
| kinematic viscosity (KV) at 100° C.: | 1120 cSt; |
| turbidity: | 22 N.T.U; |
| dispersivity index: | 100/100; |
| percent nitrogen content: | 0.19%. |

The above said solution is diluted to 10% in SN150.
The resulting solution displays the following characteristics:

| | |
|---|---|
| KV at 100° C.: | 10.6 cSt; |
| KV at 40° C. | 67.63 cSt; |
| shear stability (CEC-L-14-A 88 test): | 14.24%; |
| DV (−20° C.): | 3000 cP; |
| pour point: | −33° C. |

In order to evaluate the "A" Additive as an additive for lubricating oils, a lubricant of SAE 10W40 grade is used, which contains:
- 51.5% of mineral base oils,
- 24.0% of synthetic base oils,
- 14.5% of the usual additive package (constituted by a zinc dithiophosphate, an overbasic calcium sulfonate, a polyisobutenylsuccinimide, a sulfophenol and an aromatic amine),
- 10% of the solution of "A" Additive in mineral oil, as obtained from the about disclosed grafting and polymerization reaction.

A first test is carried out in order to check the compatibility with fluoroelastomers, of the formulation prepared as explained above.

For that purpose, the test designated as "VW Test PV 3344—Seals compatibility" is carried out. The results of the above said test is reported in Table 1, in which the specification limit is indicated in brackets.

TABLE 1

| | | |
|---|---|---|
| Tensile strenght (MPa): | | 9.9 (≧8.0); |
| Elongation at break (%): | | 186 (≧160); |
| Cracks at 100%: | no cracks | (no cracks). |

For the evaluation of engine performance, a SAE 15W40 grade lubricating oil having the following composition:

| | |
|---|---|
| mineral base oils: | 81.15% by weight, |
| additive package: | 10.35% by weight, |
| solution of "A" additive in mineral oil (as obtained from the above disclosed grafting and polymerization reaction): | 8.50%. |

In order to evaluate the performance of the so formulated lubricant, the engine test was carried out, which is designated as "VE sequence" (ASTM STP 315H PTIII procedure), the results of which are reported in Table 2 together with, in brackets, the specification limits.

TABLE 2

| | |
|---|---|
| Average engine sludges: | 9.24 (minimum 9); |
| Average engine Laquers: | 5.61 (minimum 5); |
| Piston skirt Laquers: | 7.05 (minimum 6.5); |
| Average cam wear (mil): | 0.69 (maximum 5.0); |
| Maximal cam wear (mil): | 1.1 (maximum 15); |
| Pour point: | −30° C. |

EXAMPLES 2-7

By following the same procedure as disclosed for the "A" polymeric additive of Example 1, other polymeric additives are prepared (still by starting from 300 g of a solution of 10% of ethylene-propylene copolymer in mineral oil), by varying the ratio of $C_{12}$–$C_{14}$ to $C_{16}$–$C_{18}$ methacrylates, the amount of acrylic acid and the amount and type of amine.

Also the time of the first step of polymerization, the amount of peroxide and the end stripping time were varied.

EXAMPLE 2

"B" polymeric additive prepared by starting from 20 g of methacrylic esters (ratio of $C_{12}$–$C_{14}$ esters to $C_{16}$–$C_{18}$ esters equal to 75:25), 1.6 g of acrylic acid and 2.57 g of pentaethylenehexamine (PEHA). The polymerization reaction time is of 4 hours and 3 g of t-butyl peroctanoate is used. The stripping step time is 90 minutes.

The end polymeric solution has a value of kinematic viscosity at 100° C. (KV) of 1209 cSt, of dispersivity index (I.D.) of 158/155, of pour point at 10% in SN 150 miner al oil of −24° C., and of turbidity, of 26 N.T.U.

EXAMPLE 3

"C" polymeric additive prepared by starting from 10 g of methacrylic esters (ratio of $C_{12}$–$C_{14}$ esters to $C_{16}$–$C_{18}$ esters equal to 75:25), 1.6 g of acrylic acid and 1.46 g of dipropylenetriamine (DPTA). The polymerization reaction time is of 2 hours and 2 g of t-butyl peroctanoate is used. The stripping step time is 90 minutes.

The resulting polymeric solution has a KV=1286 cSt, turbidity=21 N.T.U. and I.D.=200/200.

EXAMPLE 4

"D" polymeric additive prepared by starting from 10 g of methacrylic esters (ratio of $C_{12}$–$C_{14}$ esters to $C_{16}$–$C_{18}$ esters equal to 75:25), 2 g of acrylic acid and 1.82 g of DPTA. The polymerization reaction time is of 2 hours and 2 g of t-butyl peroctanoate is used. The stripping step time is 90 minutes.

The resulting polymeric solution has a KV=1288 cSt, turbidity=19, and I.D.=150/150.

EXAMPLE 5

"E" polymeric additive prepared by starting from 10 g of methacrylic esters (ratio of $C_{12}$–$C_{14}$ esters to $C_6$–$C_{18}$ esters equal to 75:25), 1.8 g of acrylic acid and 1.64 g of DPTA. The polymerization reaction time is of 2 hours and 2 g of t-butyl peroctanoate is used. The stripping step time is 90 minutes.

The resulting polymeric solution has a KV=1278 cSt, turbidity=30, and I.D.=154/150.

EXAMPLE 6

"F" polymeric additive prepared by starting from 20 g of methacryliic esters (ratio of $C_{12}$–$C_{14}$ esters to $C_{16}$–$C_{18}$ esters equal to 65:35), 2 g of acrylic acid and 2.03 g of TETA. The polymerization reaction time is of hours and 2 g of t-butyl peroctanoate is used. The stripping step time is 120 minutes.

The resulting polymeric solution has, at 10% in mineral oil, a pour point of −36° C.; I.D.=161/152.

EXAMPLE 7

"G" polymeric additive prepared by starting from 15 g of methacrylic esters (ratio of $C_{12}$–$C_{14}$ esters to $C_{16}$–$C_{18}$ esters equal to 60:40), 1.6 g of acrylic acid and 1.62 g of TETA. The polymerization reaction time is of 3 hours and 2 g of t-butyl peroctanoate is used. The stripping step time is 150 minutes.

The resulting polymeric solution has, at 10% in mineral oil, a pour point of $-33°$ C.; I.D.$=135/125$.

We claim:

1. A viscosity index improver additive, obtained by a process comprising
    (a) reacting a copolymer selected from the group consisting of ethylene-propylene and ethylene-propylene-diene under free-radical polymerization conditions with a mixture of (meth) acrylic acid and one or more (meth) acrylate ester(s) of the formula $$CH_2=C(R)-COOR' \qquad (I)$$

to form a graft copolymer having carboxy groups, wherein R is hydrogen or methyl, R' is alkyl of from 8 to 25 carbon atoms such that branched (meth) acrylate ester(s) are less than 20% by weight of said (meth)acrylate ester(s), and said copolymer, said (meth) acrylic acid and said (meth) acrylate ester(s) are present in amounts providing a respective weight ratio of from 40:20:1 to 10:2:1, and
    (b) reacting said graft copolymer having carboxy groups with a sufficient amount of a polyamine of the formula (II)

$$NH_2-(CH_2)_b-(-NH-(CH_2)_b-)_n-NH_2 \qquad (II)$$

wherein b is 2 or 3, and n is an integer of from 0 to 5, under conditions which transform essentially all of said carboxy groups to amidic groups.

2. The additive of claim 1, wherein n in formula (II) is from 1 to 4.

3. The additive of claim 1, wherein R' is alkyl of from 10 to 20 carbon atoms.

4. The additive of claim 3, wherein R' is a mixture of $C_{10}$–$C_{15}$ and $C_{16}$–$C_{20}$ alkyl radicals.

5. The additive of claim 4, wherein R' is a mixture of $C_{12}$–$C_{14}$ and $C_{16}$–$C_{18}$ alkyl radicals in a ratio of from 6:1 to 0.5:1 by weight.

6. The additive of claim 5 wherein said ratio of $C_{12}$–$C_{14}$ and $C_{16}$–$C_{18}$ alkyl radicals is from 3:1 to 1:1.

7. The additive of claim 1, wherein said respective weight ratio of said copolymer, said (meth) acrylic acid and said (meth) acrylic ester (s) is from 25:16:1 to 14:3:1.

8. The additive of claim 1, wherein said polyamine is present in an amount providing a molar ratio of 1:2, based on (meth) acrylic acid.

9. The additive of claim 1, wherein said reacting step (a) is carried out at a temperature of from 70° to 150° C.

10. The additive of claim 1, wherein said reacting step (b) is carried out at a temperature of from 130° to 190° C.

11. The additive of claim 1, wherein each of said reacting steps (a) and (b) are conducted in an inert solvent.

12. The additive of claim 11, wherein said inert solvent is a mineral oil.

13. A solution comprising from 5 to 30% by weight of the additive of claim 1, with the balance being a solvent-extender.

14. The composition of claim 13, wherein said additive is present in an amount of from 10 to 20% by weight, and said solvent-extender is a mineral oil.

15. A lubrication oil composition, comprising a mineral or semi-synthetic oil and an effective amount of the additive of claim 1 to improve dispersant properties and depress the pour point of said mineral or semi-synthetic oil.

16. The lubricator oil composition of claim 15, wherein said additive is present in an amount of from 0.4 to 6% by weight.

17. The lubrication oil composition of claim 16, wherein said additive is present in an amount of from 0.6 to 4% by weight.

* * * * *